Jan. 20, 1970  R. H. GOLDSTON, JR  3,490,627
LIFT DEVICE
Filed March 19, 1968  2 Sheets-Sheet 1
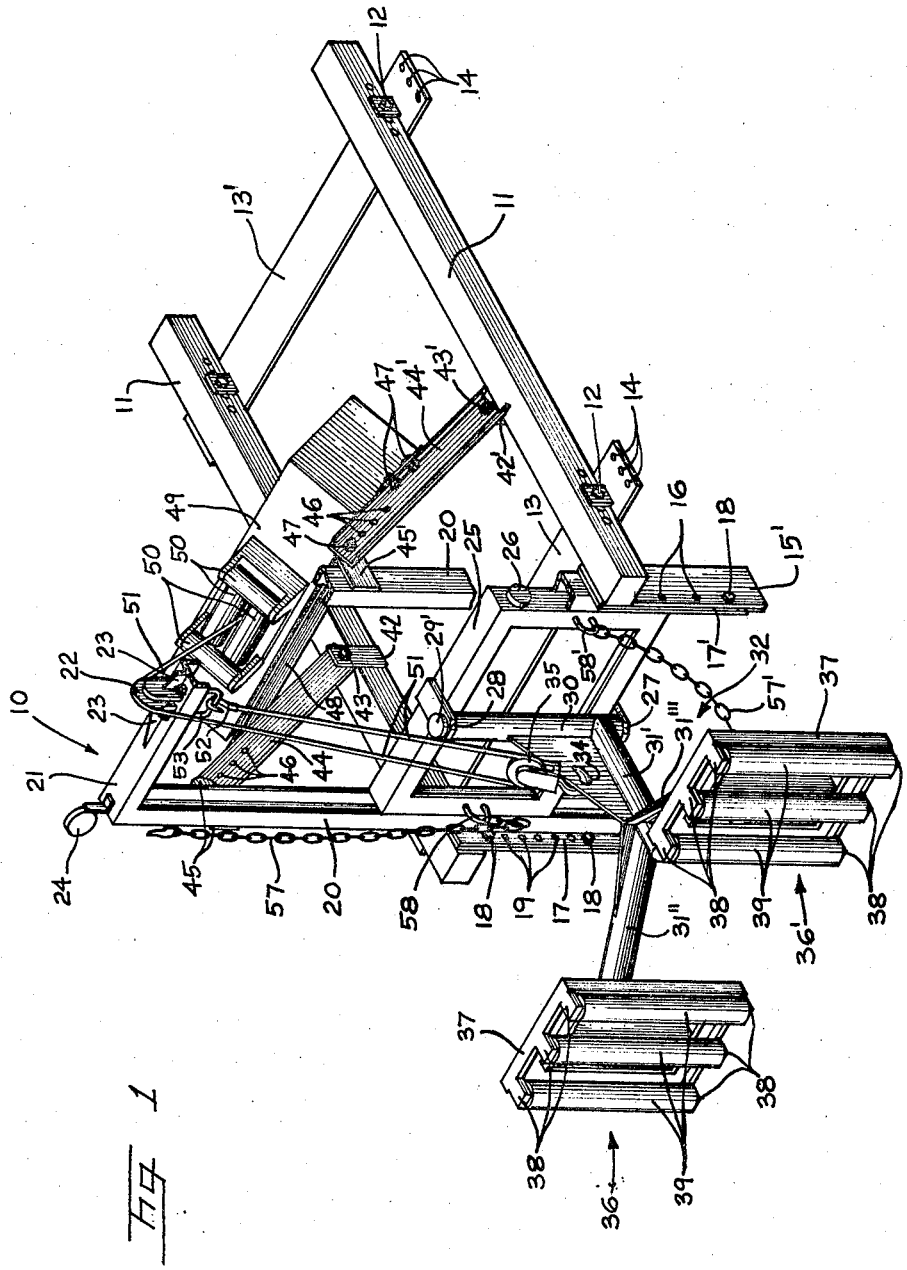
INVENTOR.
ROLAND H. GOLDSTON JR.
BY
John G. Mills PA
ATTORNEY.

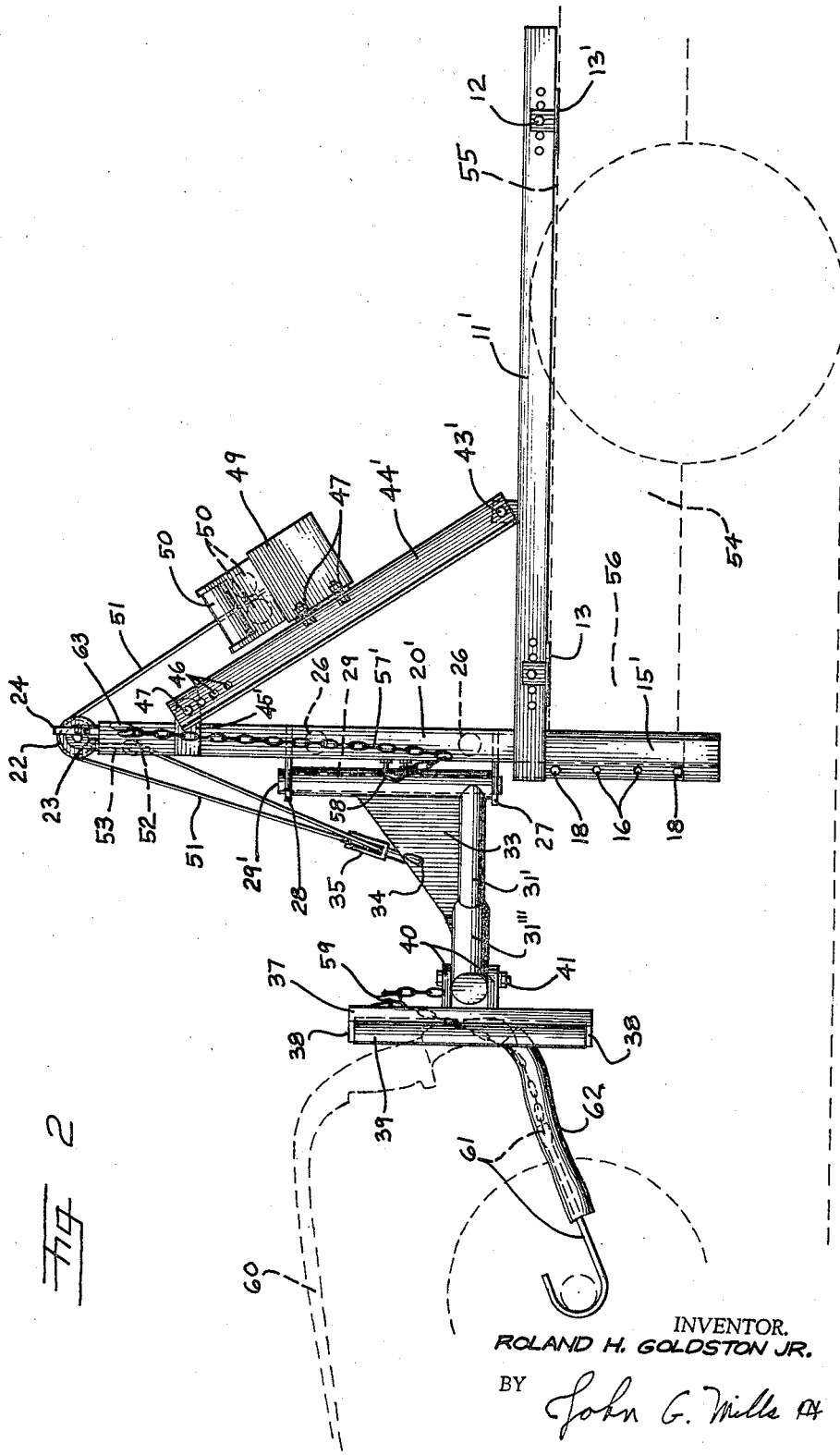

United States Patent Office 3,490,627
Patented Jan. 20, 1970

1

3,490,627
LIFT DEVICE
Roland H. Goldston, Jr., 504 Glendale Drive,
Wilson, N.C. 27893
Filed Mar. 19, 1968, Ser. No. 714,258
Int. Cl. B66c 23/44; B62d 53/04
U.S. Cl. 214—86                                        4 Claims

ABSTRACT OF THE DISCLOSURE

In abstract, a preferred embodiment of this invention is a self-contained vehicle lifting and towing device which is readily installable and removable from truck-type vehicles.

---

This invention relates to land vehicles and more particularly to devices which adapt one vehicle to lift and tow another vehicle particularly when the latter has for some reason become disabled.

In the past, various configurations of what are commonly called wreckers have been developed as emergency service vehicles in an effort to render towing services to disabled vehicles at as low and competitive price as possible while giving the operator a profit. Up until recently almost all emergency service vehicles were single-purpose units with an angular boom for supporting a winch cable and hook. In addition to being a single-purpose vehicle, this type of unit has the disadvantage in that when two wheels of the towed vehicle are lifted clear of the ground and the towing vehicle moves forward, the downwardly projecting cable is set in a pendulum motion with the towed vehicle first holding back and then swing forward into contact with the towed vehicle. It is not only detrimental to control of the two vehicles but can cause extensive damage in the contact area. Even the use of tires or other large pads does not eliminate the inconveniences and dangers involved.

In recent years, attempts have been made to get away from the single-purpose wrecker type vehicle by the introduction of boom-type lift devices so constructed as to be readily attachable and detachable from vehicles such as pick-up trucks, jeeps and the like. Even though this does provide a multipurpose vehicle, the inherent disadvantages of a boom-type lift are still present.

Additional efforts have been made by providing bumper engaging pads connected to hydraulically operated vertically travelling lift devices for attachment to the rear of pick-up type trucks. These devices, however, have been limited to complicated electrically controlled hydraulic systems with the latter being used to lock the device in an elevated position against both upward and downward movement. These devices have also been limited to difficulty operated bracket connections between the bumper engaging pad and the lift unit itself. These brackets have proved completely unsatisfactory during normal use since the slightest bend or nick can cause binding and inoperativeness.

A further disadvantage in all of the prior art devices, whether of the boom-type or the vertical-lift type, has been that when vehicles such as late model automobiles manufactured by General Motors Corporation are towed, the projection of the hood beyond the front bumper causes damage to such hood and associated grill portions against the flat bumper engaging means. Additionally, if the bumper engaging means is flat, it does not properly contact rounded bumpers and conversely, if the engaging means is rounded, it does not properly contact flat bumpers. Another area of great problem is that if the vehicle has a trailer hitch it cannot be lifted by the rear without greatly damaging the bumper pad of the towing vehicle.

2

The present invention has been developed after much research and study into the above mentioned problems and is designed to provide a simply installable and removable vehicle lift and tow device which is simple in construction, inexpensive to manufacture and yet is rugged and fool-proof in operation. This invention is adapted to be removably mounted to the rear portion or bed of small vehicles such as jeep-type and pick-up type trucks. No prime mover means are provided for downward movement and no locking means is provided against upward movement. Due to novel design in the bumper engaging and support bracket portion of the device, any American manufactured automotive-type vehicle can be lifted and towed without special adaptors and without damage to either the towing vehicle or the towed vehicle. There are no adjustment means within the bracket portion to become inoperative due to bending or other abuse.

It is, therefore, an object of the present invention to provide a vehicle raising and towing device which is readily attachable and removable from pick-up and jeep-type vehicles.

Another object of the present invention is to provide a vehicle raising and towing device having a simple means for raising the towed vehicle and means for locking the device when in an elevated position against downward movement.

A further object of the present invention is to provide a vehicle lifting and towing device including a pivoted, generally Y-shaped bracket having a separate pad pivotably mounted at the end of the two outermost arms to allow vehicles with separated bumpers or with projections in the center of the end portion to be lifted and towed in the same manner as vehicles having unitary bumpers or no projection therebeyond.

Another object of the present invention is to provide a central point of lift on the bracket portion of a towing device thereby greatly reducing the leverage strain on the entire system.

Other objects and advantages of the present invention will become apparent and obvious from a study of the following description and the accompanying drawings which are merely illustrative of the present invention.

In the drawings:

FIG. 1 is a cutaway perspective of the lift unit ready for attachment to a towing vehicle; and FIG. 2 is a side elevational view in schematic form of the device in actual use.

With further reference to the drawings, the lift device indicated generally at 10 is composed of a pair of generally parallely disposed base frame members 11 and 11'. Adjustably secured to, by means such as frame bolts 12, and extending between frame members 11 and 11' are mounting plates 13 and 13'. A series of openings 14 are provided in each end of mounting plates 13 and 13' so that such mounting plates may be secured to a truck-type vehicle as will hereinafter be described in more detail.

Fixedly secured respectively to, and depending from, frame members 11 and 11' on their ends adjacent mounting plate 13 are vertically disposed mounting brackets 15 and 15'. A series of openings 16 are provided vertically along the rear edge of each of these brackets.

A pair of frame support brackets 17 and 17' are adapted to be mounted juxtaposed, respectively, to mounting brackets 15 and 15'. The relationship between these brackets is adjustable in a vertical direction by passing bolts 18 selectively through openings 16 of the mounting brackets and openings 19 of the support brackets.

Fixedly secured respectively to support brackets 17 and 17' are vertical frame members 20 and 20'. As will be noted particularly in FIG. 1, each of these last mentioned frame members is constructed in a configuration commonly called a channel which is generally U-shaped in cross section.

Joining the upper ends of vertical frame members 20 and 20' and fixedly secured thereto is cross frame 21. Fixedly secured to the upper surface in the central portion of this last mentioned frame is a pulley 22. A pair of gussets 23 are provided between frame 21 and pulley 22 to further strengthen the fixed relation therebetween. Adjacent the junctures between the vertical frames and the cross frame can be mounted combination brake and stop light means such as that indicated at 24 so that the intentions of the towing vehicle may be indicated to vehicles following a towed vehicle without being obstructed from view.

A generally box-shaped slide frame 25 is mounted for vertical travel on and extends between vertical frames 20 and 20' by means of a series of rollers such as that seen at 26 in the cutaway portion of FIG. 1. As will be obvious from the drawings, the rollers are adapted to travel within the channel portion of the vertical frame members thus assuring smooth guillotine type movement of the slide relative to the vertical frame.

A lower tab 27 is fixedly secured to the bottom portion of slide frame 25. An upper tab 28 is fixedly secured to the top portion thereof in vertical alignment with said first mentioned tab. A pivot pin 29 with a bulbous head 29' is adapted to pass through the upper tab 28, sleeve 30 and into lower tab 27 to allow said sleeve to freely oscillate for purposes which will hereinafter become obvious.

Fixedly secured to and perpendicularly extending from sleeve 30 is base arm 31' of the Y-frame assembly indicated generally at 32.

A tapered, generally Y-shaped gusset 33 is fixedly secured to the Y-assembly to reinforce and strengthen the same. In the upper portion of the gusset above base arm 31' is an opening 34 through which pulley block 35 may be attached.

Pivotably mounted on generally vertical axis to the exterior ends respectively of arms 31" and 31''' are lifted unit engaging pads 36 and 36'. These pads may be either vertically disposed or slightly inclined as desired.

Each pad is composed of a generally square frame 37 upon which are rotatively mounted by means of support tabs 38 a multiplicity of rollers 39. On the side of each of the frames 37 opposite the rollers 39 is pivot brackets 40 through which a vertically disposed pivot pin 41 is adapted to pass to pivotably connect the pad to the end of the arm of Y-assembly 32.

Fixedly secured to the central portion of base frames 11 and 11' respectively are upwardly projecting brace support tabs 42 and 42'. Secured to these tabs by means such as bolts 43 and 43' are brace members 44 and 44'. These brace members extend from their connection point with their respective tabs to a point adjacent tabs 45 and 45' which are in turn fixedly secured to vertical frame members 20 and 20'. A multiplicity of openings 46 are provided in the upper portion of the angularly disposed braces 44 and 44' to allow the guillotine shaped frame to remain perpendicularly disposed to the base frame members regardless of the height adjustment between brackets 15–15' and 17–17'.

Extending between and fixedly secured by bolts 47 to brace members 44 and 44' is a winch mounting plate 48. Removably secured to plate 48 is a winch unit 49. This unit, although preferably operated electrically, can be hydraulically or manually operated.

Two pairs of rollers 50 are mounted about the opening within the winch unit 49 through which cable 51 passes. This cable is threaded through pulley 22 about pulley block 35 and releasably secure through hook 52 and U-bolt 53 to cross frame 21.

To install the lift unit 10 of the present invention in a light pick-up type or jeep-type vehicle such as that indicated in outline 54, such unit is slid onto the bed portion 55 until brackets 15 and 15' are adjacent the tailgate portion 56. Next, if they are not already existing, holes are made through the truck bed so that bolts may be passed through openings 14 in the base plates 13 and 13' to secure such base plates to the frame of the truck (not shown). From this it can be readily seen that with a minimum of effort and time expended, the device of the present invention can be attached to or removed from a carrying vehicle.

Once the base plates have been secured to the bed, the unit is ready for operation. To prevent the Y-frame assembly 32 from oscillating, possibly violently, due to centrifugal forces placed on it by the motion of the carrying vehicle, a pair of chains 57 and 57' are releasably attached to each of the frames 37 by means of a hook such as that disclosed at 59. The other end of these chains are hooked to frame 25 through attachments 58 and 58'. Thus it can be seen that the pads 36 may be used as a bumper for the carrying vehicle when held in relative fixed lateral position by the releasable chains. The height of the Y-frame assembly 32 during transport is determined by the position in which the cable 51 is braked or locked in the winch unit 49.

When the towing vehicle is moved into position with vehicle 60 to be towed, chains 57 and 57' are released from the Y-assembly so that the same may swing to conformingly engage the bumper or other desired portion of such vehicle to be towed. Hook-chains such as that indicated at 61 in FIG. 2 are hooked to the axle or other part of the towed vehicle and a padded sleeve 61 for each chain adjusted to prevent metal to metal contact. The other end of each hook-chain 61 is releasably secured to the hook 59 of its adjacent frame 37.

After the vehicle 60 has been properly connected to the Y-frame assembly as hereinabove described, the winch 49 is activated by controls (not shown) which through the action of the block and tackle arrangement of the cable 51 and pulley block 35, begins to raise frame 25 and the Y-assembly pivoted thereon. When the desired height has been reached, the winch is locked in position by means (not shown). Chains 57 and 57' are releasably secured to means such as a hook 63 on either side of vertical frames 20 and 20'. The purpose of securing these chains to the hooks is twofold—first to prevent them from dragging and secondly, to act as a safety chain against downward movement of frame 25 should the cable break or the winch slip.

Upon being secured and lifted as described, the towed vehicle will act as a trailer behind the towing vehicle with the only relative movement therebetween being pivoting on pivot pin 29 during turns. Obviously the danger of pendulum movement between the two vehicles so inherent in the boom-type wrecker is completely eliminated.

When it is desired to disconnect the towed vehicle from the towing vehicle, the winch 49 is activated to relieve any pressures on the chains 57 and 57' so that they may be released from their respective hooks 63. The cable 51 is then brakingly fed out of the winch to allow frame 25 and its associated Y-assembly 32 to move downwardly by gravitational force until the pressure on hook-chains 61 is relieved to the point where they can be released from the hooks 59 of the pad frames 37. Chains 57 and 57' may now be replaced in their adjacent hooks 59, the hook-chains 61 stored in any convenient location and the tow unit is ready for transport to the location of the next towing job.

Should the vehicle to be towed be in an overturned position, pulley block 35 may be unhooked from the opening 34 of the Y-assembly gusset and hooked to any convenient location on such overturn vehicle. The winch can then be activated to pull such vehicle to an upright position. If it is impossible for the towing vehicle to get within a reasonably close distance to the overturn vehicle, hook 52 of cable 51 can be released from U-bolt 53 thereby increasing the amount of cable length available although reducing the mechanical advantage to be gained. This hook could, of course, be secured to some fixed object with the pulley block 35 attached to the vehicle to be turned upright to again obtain the mechanical advantage as heretofore described.

In addition to righting overturned vehicles, the cable and pulley system can also be used to slide or drag a vehicle to be towed to a more advantageous position for hook-up. This is particularly useful in wreck situations where it is not always convenient to back up to the disabled vehicle.

Although the engaging pads 36 and 36' have their primary advantage in being universally adapted to various makes and models of vehicles, they also make it possible for firm contactive connection to be made between the Y-assembly and the towed vehicle even though such vehicle may have been extensively damaged in an accident.

It is obvious that the present invention has the advantage of providing a combination lift and tow unit which is adjustable to fit various sizes of towing vehicles while being simple in construction and inexpensive in manufacture and upkeep. The present invention also has the advantage of providing an extremely simple lift system which may be locked against downward movement through the combined use of a winch brake for holding and safety chains to assure nonslippage. The present invention has the additional advantage of disclosing a lift unit combined with a nonadjustable Y-frame assembly having universally adaptable towed vehicle engaging pads for use with vehicles which heretofore could not be lifted or towed without damage.

The terms "upper," "lower," "vertical," "horizontal" and so forth have been used herein merely for convenience in the foregoing specification and in the appended claims to describe the lift device and its parts as oriented in the drawings. It is to be understood, however, that these terms are in no way limiting to the invention since the device may obviously be disposed in many different positions when it is in use.

The present invention may, of course, be carried out in other specific ways than those herein set forth without departing from the spirit and essential characteristics of the invention.

What is claimed is:

1. In combination: a truck-type vehicle having a bed portion with a rear portion adjacent thereto; a pair of parallely disposed base frame members removably attached to said bed and extending beyond said rear portion; a pair of parallely disposed upright frame members connected perpendicularly to said base frame members adjacent said rear portion; a cross member connecting the uppermost ends of said upright members; a slide member slideably mounted to and extending between said upright members; a Y-frame disposed in a plane parallel to a generally vertical plane cutting between said base members, said frame being pivotably mounted through one of its arms to said slide member so as to oscillate about an axis disposed parallel to a line passing longitudinally through either of said upright members; and separate pad means pivotably attached to the end of the two unconnected arms of said Y-frame so as to oscillate about an axis disposed parallel to the axis of the first mentioned pivot; and means to releasably attach a vehicle to be towed juxtaposed to said separate pad means.

2. The combination of claim 1 wherein each of the pads contains a plurality of vertically disposed rollers for contactive engagement with a load to be lifted.

3. The combination of claim 1 including a pair of brace members connected to and extending angularly from each base frame member to its connected upright member; a winch means connected to and extending between said brace means; a pulley means connected to the central portion of said cross member; and cable means connected to said Y-frame and extending through said pulley into operative retractive attachment with said winch whereby said slide member and its associated Y-frame may be raised and lowered.

4. The combination of claim 3 wherein at least one safety chain is connected between said slide member and said Y-frame when a load is not being lifted or held to prevent oscillation of said Y-frame relative to said slide.

References Cited

UNITED STATES PATENTS 2,726,777    12/1955    Wiley.
3,152,704    10/1964    Russell.

ALBERT J. MAKAY, Primary Examiner

U.S. Cl. X.R.

280—402